United States Patent
Sung et al.

(10) Patent No.: US 10,468,920 B2
(45) Date of Patent: Nov. 5, 2019

(54) COOLANT FLOW DISTRIBUTION USING COATING MATERIALS

(71) Applicant: Ford Global Technologies, LLC, Dearborn, MI (US)

(72) Inventors: Myung Ki Sung, Ypsilanti, MI (US); Edward Chan-Jiun Jih, Troy, MI (US); Michael W. Degner, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 413 days.

(21) Appl. No.: 15/254,206

(22) Filed: Sep. 1, 2016

(65) Prior Publication Data
US 2018/0062456 A1    Mar. 1, 2018

(51) Int. Cl.
| | |
|---|---|
| *H02K 1/06* | (2006.01) |
| *H02K 9/19* | (2006.01) |
| *H02K 15/02* | (2006.01) |
| *H02K 1/12* | (2006.01) |
| *H02K 7/00* | (2006.01) |
| *B60L 50/51* | (2019.01) |

(52) U.S. Cl.
CPC .............. *H02K 1/06* (2013.01); *B60L 50/51* (2019.02); *H02K 1/12* (2013.01); *H02K 7/006* (2013.01); *H02K 9/19* (2013.01); *H02K 15/02* (2013.01)

(58) Field of Classification Search
CPC ...... H02K 1/06; H02K 2203/09; H02K 15/02; H02K 9/19; H02K 15/12; H02K 3/44; H02K 1/2786; H02K 3/30; H02K 3/325; H02K 3/38; H02K 3/522; H02K 5/08; B60L 11/18; B05D 5/083; B05D 7/56; B05D 2602/00; C08J 7/047; Y10T 428/31544; Y10T 428/3154

See application file for complete search history.

(56) References Cited

U.S. PATENT DOCUMENTS

| | | | |
|---|---|---|---|
| 5,416,373 A | 5/1995 | Maruyama et al. | |
| 2008/0299359 A1* | 12/2008 | Klaussner | H02K 3/38 428/206 |
| 2009/0091088 A1* | 4/2009 | Berendt | F16J 15/3224 277/307 |
| 2010/0295395 A1* | 11/2010 | Baudelocque | F16C 32/047 310/86 |

(Continued)

FOREIGN PATENT DOCUMENTS

| | | |
|---|---|---|
| DE | 102014213768 A1 | 1/2016 |
| JP | 2012205420 A  * | 10/2012 |
| WO | 2014198451 A1 | 12/2014 |

OTHER PUBLICATIONS

JP 2012205420 A machine translation Dec. 21, 2018.*

*Primary Examiner* — Mang Tin Bik Lian
*Assistant Examiner* — Leda T Pham
(74) *Attorney, Agent, or Firm* — David Kelley; Brooks Kushman P.C.

(57) ABSTRACT

A vehicle powertrain includes a stator defining a circular opening having an inner diameter, and a rotor to rotate within the circular opening such that a gap is formed between a rotor surface and the stator at the inner diameter. The powertrain further includes a repellant, coated on the stator and the rotor surface, to control fluid flow in the gap.

16 Claims, 5 Drawing Sheets

(56) References Cited

U.S. PATENT DOCUMENTS

| | | | |
|---|---|---|---|
| 2013/0062978 A1* | 3/2013 | Yamaji | H02K 3/38 |
| | | | 310/71 |
| 2014/0087134 A1 | 3/2014 | Gesford et al. | |
| 2014/0126606 A1* | 5/2014 | Ito | G01K 7/427 |
| | | | 374/163 |
| 2015/0050459 A1* | 2/2015 | Lim | C09D 5/1681 |
| | | | 428/142 |
| 2015/0318770 A1* | 11/2015 | Behrendt | B05D 5/083 |
| | | | 310/45 |

* cited by examiner

COOLANT FLOW DISTRIBUTION USING COATING MATERIALS

TECHNICAL FIELD

This application is generally related to an electric machine of a hybrid electric vehicle in which stator and rotor surfaces are coated with an oleophobic material to aid in coolant flow in a gap therebetween.

BACKGROUND

The power density of electronic devices, such as electric machines and power inverters, is continuously increasing to meet weight and cost reduction targets. To meet these targets, it is generally important to increase the efficiency and performance of the electronic device. The performance and efficiency of electric machines are generally limited by the temperature constraint on the copper windings and/or the maximum current which should overcome the friction losses in the air gap. For electric machine thermal management, it may be important to maintain uniform coolant flow (e.g., water/glycol, oil, or Automatic Transmission Fluid) on the end-windings of the electric machine to remove the localized hot spots. The performance and efficiency of power inverters are generally limited by the thermal constraints in insulated-gate bipolar transistors (IGBTs) and/or diodes. For inverter thermal management, a liquid cold plate may be used to cool components, such as IGBTs, diodes, solder layers, etc., inside the inverter.

SUMMARY

An electric machine includes a stator defining a circular opening having an inner diameter, a rotor configured to rotate within the circular opening such that a gap is formed between the rotor and stator, and an oleophobic or hydrophobic coating on the rotor and stator. The coating is configured to increase a contact angle between a lubricating fluid and the rotor and stator in contact therewith to control a flow of the fluid.

A vehicle powertrain includes a stator defining a circular opening having an inner diameter, a rotor configured to rotate within the circular opening such that a gap is formed between a rotor surface and the stator at the inner diameter, and a repellant, coated on the stator and the rotor surface, configured to control fluid flow in the gap.

A method includes applying one or more layers of an oleophobic or hydrophobic coating to an inner diameter of a stator of an electric machine such that the one or more layers control a flow of a fluid within a cavity defined by the stator.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Some electric machines, for example, an electric machine for a hybrid vehicle or an electric vehicle, operate in harsh conditions. The harsh conditions may include temperature, humidity, airflow, and debris. The harsh conditions may be attributed to environmental aspects that may be further exacerbated by requirements of the electric machine, such as constraints on size, configuration, input power, and output power. To help reduce heat generated during the operation of the electric machine, a cooling system may be used. The cooling system may include a fluid that flows around windings and components of the electric machine. In some cases, the fluid is in contact with the windings and components of the electric machine. The fluid may then be circulated, for example through a radiator, to remove some of the heat from the electric machine. For example, in some automotive systems, an electric machine is cooled with the automatic transmission fluid (ATF) that is circulated around the windings and components and then circulated to a radiator. In some embodiments, coolant channels are used to direct the flow through a stator of the electric machine. Typically the electric machine is configured such that a gap is formed between a rotor that rotates within the stator and the stator teeth, as such, reduction of rotating resistance and friction between the rotor and stator is an important aspect to increase the performance of the electric machine. The rotating resistance includes the friction of air or other liquids and the surface of the rotor.

Here, rotor rotating resistance and friction is reduced by applying advanced coating materials including a repellant coating and a wetting coating. For example, repellant coatings (herein after, "repellant") include oleophobic, super-oleophobic, hydrophobic, and super-hydrophobic. And wetting coatings (herein after, "wetting") include oleophilic, super-oleophilic, hydrophilic, and super-hydrophilic coating. Both repellant and wetting coatings may be applied to the electric machine to improve efficiency. For example, a hybrid vehicle with an electric machine that is cooled using an ATF that is oil based may have the stator teeth coated with a oleophobic or super-oleophobic material while the rotor outer diameter is also coated with a oleophobic or super-oleophobic material. This will increase the contact angle of the ATF on the stator teeth and the rotor outer diameter such that friction of the fluid in the gap (e.g., ATF) between the stator and rotor will be reduced. In another embodiment, the rotor and stator orientation may include a partial helical configuration to aid in the flow of a fluid in the gap between the stator and rotor. In yet another embodiment, an oleophilic material may be applied to the windings between the stator teeth to draw the fluid to the windings to aid in heat removal and to remove the fluid from the gap between the stator teeth and the rotor outer diameter.

Figure 1A:
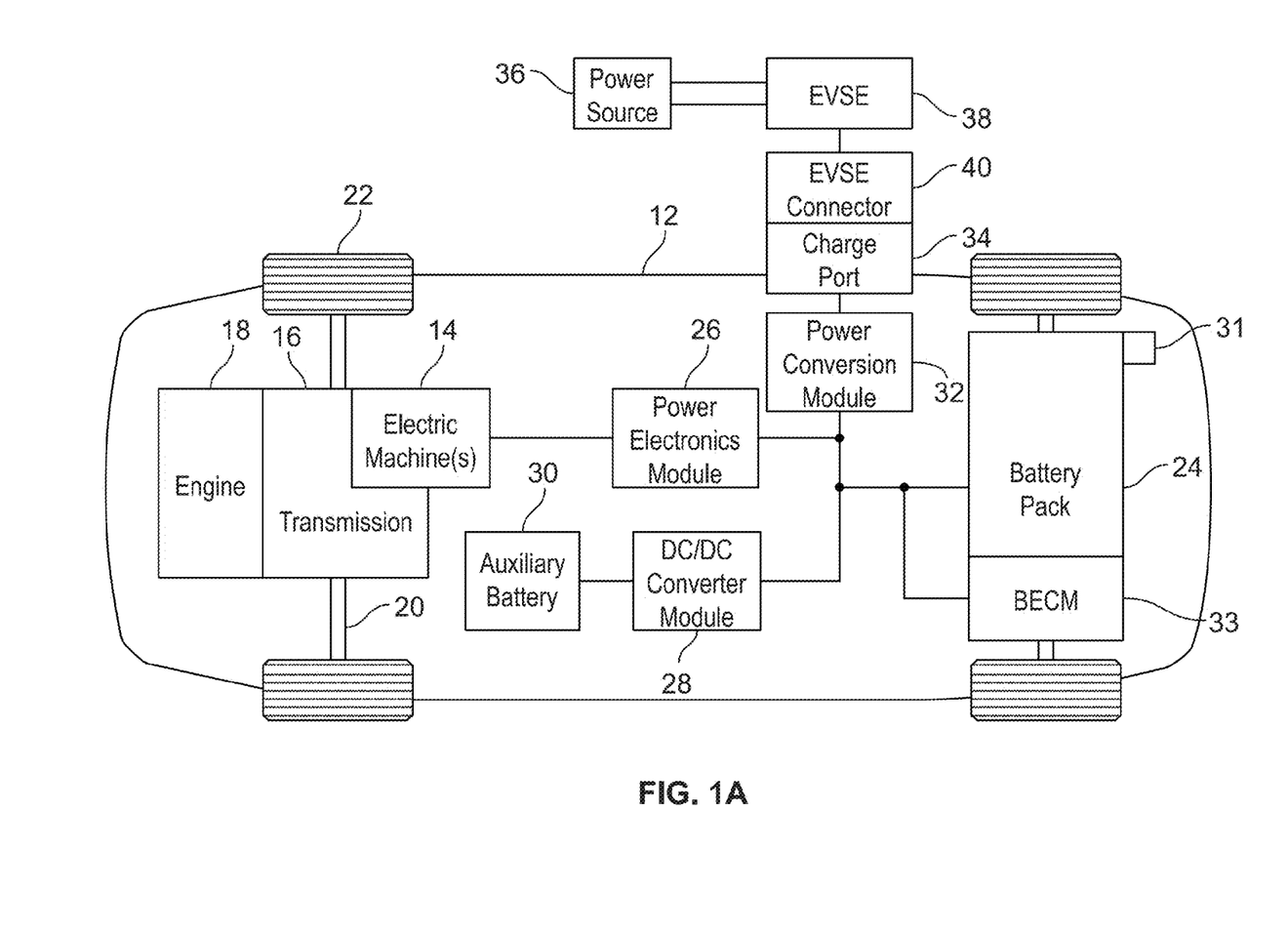
FIG. 1A is a schematic diagram illustrating an example of an electrified vehicle.

FIG. 1A depicts a schematic of an example of a vehicle powertrain of a PHEV, referred to as a vehicle 12 herein. The vehicle 12 may comprise one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to a set of wheels 22. The electric machines 14 can provide propulsion and deceleration capability when the engine 18 is turned on or off. The electric machines 14 may also act as generators and may provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that may be used by the electric machines 14. The traction battery 24 may provide a high voltage DC output from one or more battery cell arrays, sometimes referred to as battery cell stacks, within the traction battery 24. The battery cell arrays may include one or more battery cells. The traction battery 24 may be electrically connected to one or more power electronic modules 26 through one or more contactors (not shown). The one or more contactors may isolate the traction battery 24 from other components when opened and may connect the traction battery 24 to other components when closed. The power electronics module 26 may also be electrically connected to the electric machines 14 and provide the ability to bi-directionally transfer electrical energy between the traction battery 24 and the electric machines 14. For example, the traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A DC/DC converter module 28 may convert a high-voltage DC output of the traction battery 24 to a low voltage DC supply that is compatible with other vehicle loads. Other high-voltage loads, such as compressors and electric heaters, may be connected directly to the high-voltage DC output without the use of the DC/DC converter module 28. The low-voltage systems may be electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be an electrified vehicle which includes components for a PHEV, a FHEV, a MHEV, or a BEV. The traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. The various components discussed may have one or more associated controllers to control and monitor the operation of the components. The controllers may communicate via a serial bus (e.g., Controller Area Network (CAN), Local Interconnect Network (LIN), or Ethernet) or via discrete conductors.

Current examples of thermal management assemblies for electric machines may introduce oil based coolants or polar fluid such as a non-conductive water based fluid to portions of the electric machine for cooling purposes. The oil or fluid may be dripped or sprayed onto wire end windings of the electric machine or may flow within the stator. However, this practice may not be very effective in cooling the end windings and stator due to a non-uniformity of coolant flow as applied to the end windings and stator. An air cooled thermal management assembly is another example of an assembly to assist in managing thermal conditions of an electric machine. In this example, a fan or blower may be located adjacent the end windings and coolant channels to push a fluid such as air, or a liquid thereto for cooling purposes.

Figure 1B:
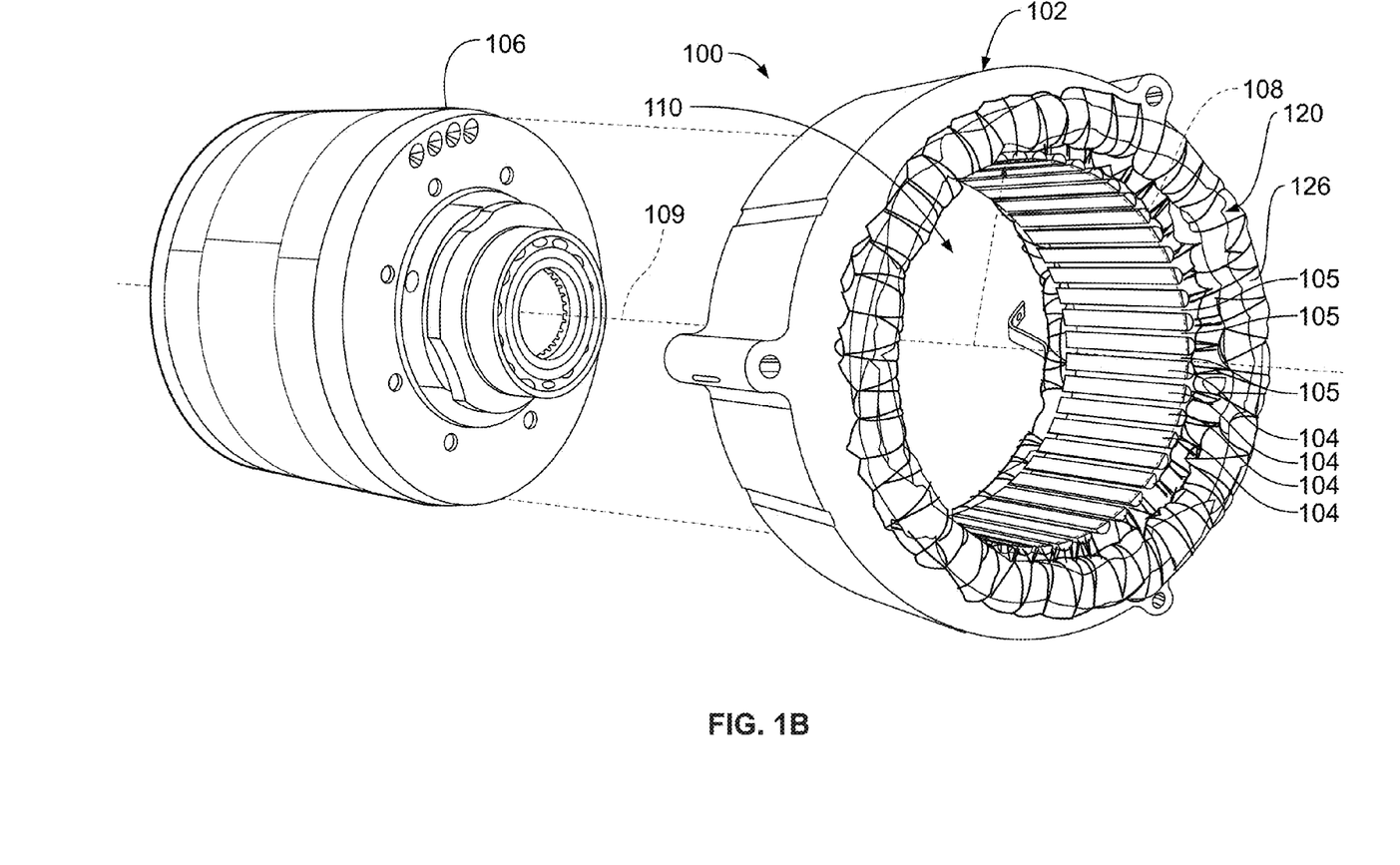
FIG. 1B is a perspective exploded view of an example of an electric machine.

FIG. 1B shows an example of an electric machine for an electrified vehicle, referred generally as an electric machine 100 herein. The electric machine includes a stator core 102, having stator teeth 104 and gaps 105 between the stator teeth 104, and a rotor 106. Stator windings are located in the gap 105 and the stator windings are wrapped around each stator tooth 104 such that a field is generated in the stator tooth to cooperate with the rotor 106. Basically, an electric machine contains poles, for example, a two pole electric machine has a single pair of magnetic poles (north and south) and is typically referenced as a 2-pole motor. In some embodiments, stator windings are the north and south poles, and, a number of stator windings can be a reasonable number of poles ranging from 2 to 12, such as 4, 6, or 8 poles. Typically, motors are not configured with more than 12 poles. Along with a number of poles, an electric machine may have a range of a number of stator teeth 104, for example, often the range of the number of stator teeth 104 of an electric machine may be from 6 to 48 stator teeth 104, such as 9, 12, 15, 18, 21, 24, 27, 30 and other multiples of 3, and may be more in some configurations. An electric machine with 48 stator teeth is typically configured with each tooth offset from the previous tooth by approximately 7.5 degrees providing channels therebetween to direct a flow of a fluid therein.

Electrified vehicles may include two electric machines. One of the electric machines may function primarily as a motor and the other may function primarily as a generator. The motor may operate to convert electricity to mechanical power and the generator may operate to convert mechanical power to electricity. However, often electric machine may operate as both a generator and a motor. An electric machine includes a stator core 102 and a rotor 106. The stator core 102 may define a circumference 108 of the circular opening based on an inner diameter of the stator and a cavity 110. The rotor 106 may be sized to fit and operate within the cavity 110. A shaft (not shown) may be operably connected to the rotor 106 to drive rotation thereof around a central axis 109. When the rotor 106 is disposed within the cavity 110, a gap is formed between a surface of the stator teeth 104 and an outer diameter of the rotor 106. The surface of the stator teeth forms a circumference 108 around a central axis 109 of the electric machine 100, the circumference defines the cavity 110 that is sized such that the rotor 106 fits within the cavity 110 thereby producing a gap between an outer surface of the rotor 106 and an inner circumference of the stator defined by an inner diameter formed by the stator teeth.

Windings 120 may be disposed within the gaps 105 of the stator core 102. In an electric machine operating as a motor, for example, current may be fed to the windings 120 to induce a magnetic field that creates a rotation force on the rotor 106. Alternatively, the electric machine may be configured as a generator such that a current is induced in the windings 120 by a rotation of an electric field from the rotor 106. Portions of the windings 120, referred to as end windings 126 herein, may protrude from the cavity 110. During operation of the electric machine 100, heat may be generated along the gaps 105 between the stator teeth 104 in which windings 120 pass and at the end windings 126. The windings 120 pass a current to either create a magnetic field that is directed by the stator teeth 104 to apply a force on the rotor 106. To remove heat generated in the windings 120 that are located along the gaps 105 between the stator teeth 104 and at the end windings 126, a coolant may flow from a radiator, around and through the stator 102 and back to the radiator.

Here, the application of a repellant onto the surface of the stator teeth 104 (i.e., the inner diameter of the cavity) and onto the surface of the outer diameter of the rotor may be used to decrease the friction of the rotor 106 spinning within the cavity 110. By increasing the contact angle, the area, in which the fluid is in contact with the surfaces, is reduced and thereby reducing the friction. In another embodiment, a repellant such as an oleophobic, super-oleophobic, hydrophobic, or super-hydrophobic is applied to the stator teeth 104 surface while a wetting coating, such as an oleophilic, super-oleophilic, hydrophilic, or super-hydrophilic, is applied to the windings located in the gaps 105 between the stator teeth 104. This configuration creates a channels by the gaps 105 between the stator teeth 104 while repelling fluid from the space between the stator teeth 104 and the rotor 106 surface. Further, in another embodiment, a helical spiral may be formed by lines of a coating on the rotor 606 to create an Archimedes screw configuration thereby promoting the movement of fluid in the channels formed in the gaps 105 between the stator teeth 104.

Figure 1C:
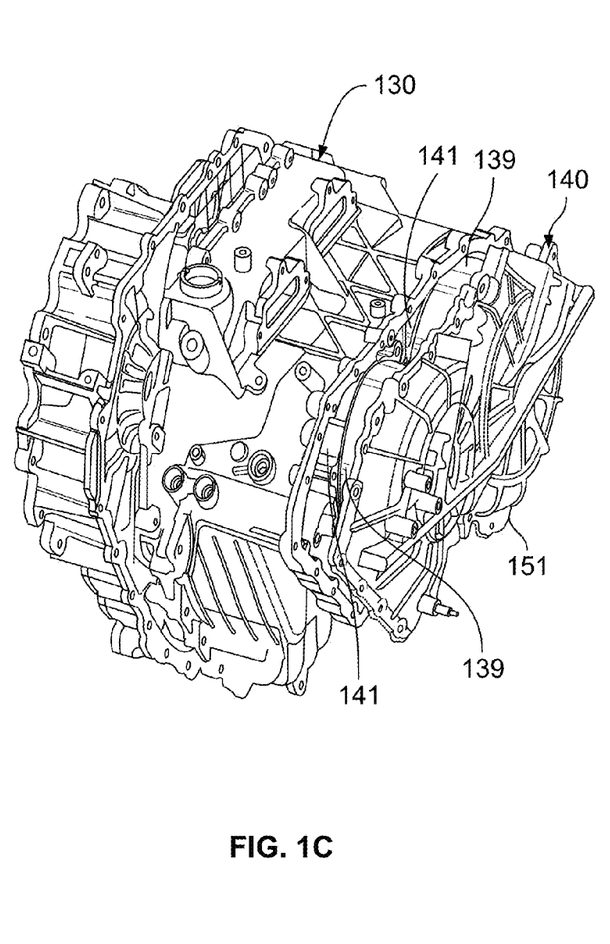
FIG. 1C is a perspective view of an electric machine assembly showing a housing with a cover partially exploded therefrom.
Figure 1D:
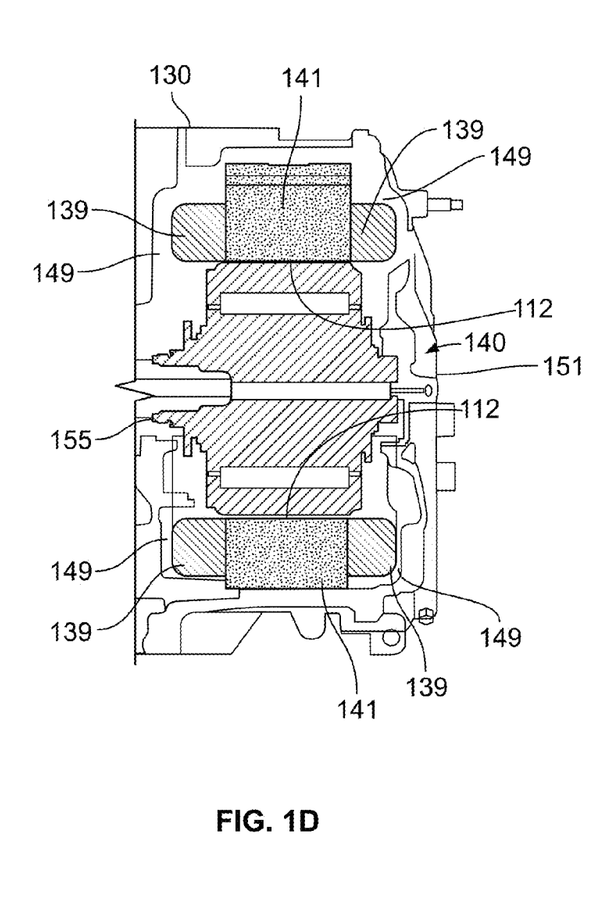
FIG. 1D is a side-view, in cross-section, of a portion of the electric machine assembly of FIG. 1C.

FIG. 1C shows an example of a housing to retain vehicle components, referred to as a housing 130 herein. Examples of vehicle components which may be retained within the housing 130 include an electric machine, such as the electric machine 100, or a vehicle transmission. A cover 140 may be secured to the housing 130. The cover 140 may define one or more features on an exterior surface 151 of the cover 140 to assist in managing thermal conditions of the end windings 139 and the fluid contained therein. FIG. 1D shows a cross-sectional view of a portion of FIG. 3A. The cover 140 may be arranged with a stator core 141 such that a channel 149 is defined by the cover 140 to receive end windings 139 extending from the stator core 141. For example, the channel 149 defined by the cover 140 may be sized such that end windings 139 protruding from the stator core 141 may be disposed therein. A rotor 155 may be operably coupled to the stator core 141 and configured to rotate freely within a cavity formed by the stator core. In this cross-sectional view, an air gap 112 is formed between the rotor 155 and the stator core 141, and more specifically, between the outer diameter of the rotor 155, that may also be referred to as the outer surface, and the inner diameter of the teeth of the stator core 141. Typically, the air gap 112 is very small to maximize the interaction of the magnetic fields of the rotor 155 and the stator core 141. The air gap 112 also may be configured such that application of one or more coatings, such as a (super) hydrophobic coating, a (super) oleophobic coating may be applied to the outer diameter of the rotor 155 and the inner diameter of the teeth of the stator core 141 and still allow the rotor 155 to freely spin within the stator core 141.

Figure 2:
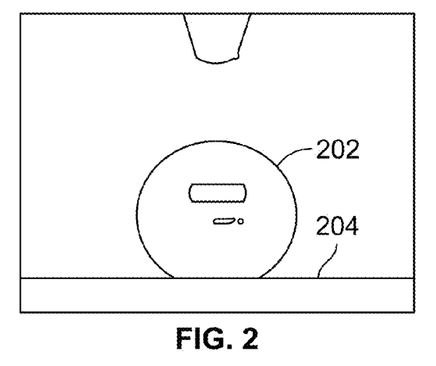
FIG. 2 is an illustration of a droplet of water on a super hydrophobic or super oleophobic coating surface having a contact angle of at least 140 degrees.
Figure 3:
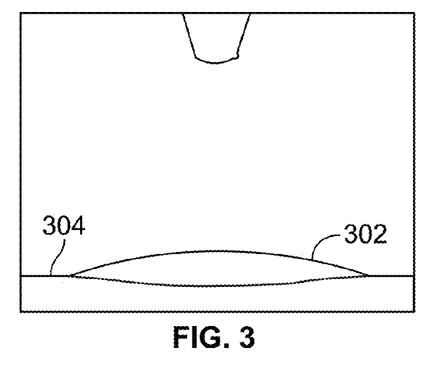
FIG. 3 is an illustration of a droplet of water on a super hydrophilic or super oleophilic coating surface having a contact angle of less than 25 degrees.

Here, the application of a coating or coatings to affect, alter, and/or control coolant distribution on an electronic device, such as an electric machine or a power inverter. The coating(s) may be a (super) hydrophobic coating, a (super) oleophobic coating, a (super) hydrophilic, or a (super) oleophilic coating. Hydrophobic and oleophobic coatings are those that repel or have a very high contact angle with water and oil, respectively. Hydrophilic and oleophilic coatings are those that attract or have a very low contact angle with water and oil, respectively. With reference to FIG. 2, an illustration of a droplet 202 of water or oil (e.g., automatic transmission fluid, ATF) is shown on a super hydrophobic/ oleophobic coating 204. As shown, the droplet 202 forms almost a perfect sphere on the coating due to its repellence. Super hydrophobic/oleophobic coatings may cause droplets of water/oil to form contact angles of 140 degrees or higher with the coating. In contrast, FIG. 3 is an illustration of a droplet 302 of water or oil (e.g., automatic transmission fluid, ATF) shown on a super hydrophilic/oleophilic coating 304. On super hydrophilic and oleophilic coatings, droplets spread out and form an almost even layer on top of the coating. Super hydrophilic/oleophilic coatings may cause droplets of water/oil to form contact angles of 25 degrees or lower with the coating.

The fluid may include a lubricating fluid such as automatic transmission fluid (ATF), engine oil, or radiator coolant. ATF is optimized for a transmission and the transmission's special requirements, such as valve operation, brake band friction, and torque converter operation as well as general gear lubrication. In some embodiments of a transmission, a transmission cooler is used to aid in cooling of the transmission fluid and components. Often friction modifiers are added to lubricants such as ATF to reduce surface friction of the lubricated parts. Typically friction modifiers are polar chemical compounds that have a high affinity for metal surfaces and possess long alkyl chains. For example, Glycerol mono-oleate is a common example of a friction modifier.

Any suitable hydrophobic, oleophobic, super hydrophobic, or super oleophobic coatings may be used in accordance with the present disclosure. In general, such coatings may have a high contact angle with the water or oils. Hydrophobic/oleophobic materials may generally be those forming a contact angle of at least 90 degrees, such as at least 100, 110, 120, 130, or 140 degrees, while super hydrophobic/oleophobic materials may generally be those forming a contact angle of at least 140 degrees, such as at least 145, 150, 155, 160, or 170 degrees, with water/oil. The coatings may form such high contact angles as a result of a nano-scale surface structure. For example, the surface of the coating may be covered in very small projections, making the coating rough on a nano-scale. The gaps between the projections may trap air and make it energetically unfavorable for liquids to wet the surface. Similarly, any suitable hydrophilic, oleophilic, super hydrophilic, or super oleophilic coatings may be used in accordance with the present disclosure. In general, such coatings may have a low contact angle with the water or oils. Hydrophilic/oleophilic materials may generally be those forming a contact angle of at most 50 degrees, such as at most 45, 40, 35, or 30 degrees, while super hydrophilic/oleophilic materials may generally be those forming a contact angle of 25 degrees or less, such as at most 20, 15, or 10 degrees, with water/oil. As an example, some Fluorinated compounds such as Fluorocarbons and fluorinated polymers are both oleophobic and hydrophobic such as Polytetrafluoroethylene.

Examples of various (super) hydrophobic/oleophobic and (super) hydrophilic/oleophilic compositions and treatment methodologies are provided in U.S. Patent Publication Nos. 2013/0109261, 2012/0009396, 2010/0314575, 2012/0045954, and 2006/0029808, and also in U.S. Pat. Nos. 8,007,638, 6,103,379, 6,645,569, 6,743,467, 7,985,451, 8,187,707, 8,202,614, 7,998,554, 7,989,619, 5,042,991, 8,361,176, 8,258,206, 6,458,867, 6,503,958 and 6,723,378, and also in International Publication No. WO2013/058843, the disclosures of which are incorporated herein by reference.

The (super) hydrophobic/oleophobic coating may be applied to the electronic device using any suitable method, which may depend on the composition of the coating itself. In one embodiment, the coating may be applied by spraying. In another embodiment, the coating may be applied using a form of deposition, such as physical vapor deposition (PVD) or chemical vapor deposition (CVD). In another embodiment, the coating may be physically transferred to the electronic device, such as by rolling or brushing. Regardless of the method of application, masks may be used to only coat certain desired areas or regions.

FIG. 2 is an illustration of a droplet of a fluid 202 on a coating 204, such as a droplet of water on a super hydrophobic or a droplet of oil on a super oleophobic coating that produces a contact angle between the surface and the fluid of at least 140 degrees. This illustration and the measurement of the angle may be provided and measured using a contact angle goniometer such as an SL150 series contact angle goniometer, developed by USA KINO.

FIG. 3 is an illustration of a droplet of a fluid 302 on a coating 304 such as a droplet of water on a super hydrophilic coating or a droplet of oil on a super oleophilic coating that produces a contact angle between the surface and the fluid of less than 25 degrees.

Figure 4:
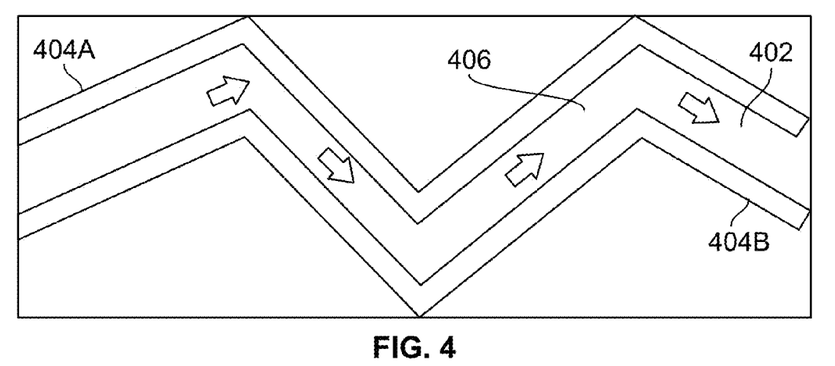
FIG. 4 is a top view of an example of a coolant channel formed between two repellant coatings.
Figure 5:
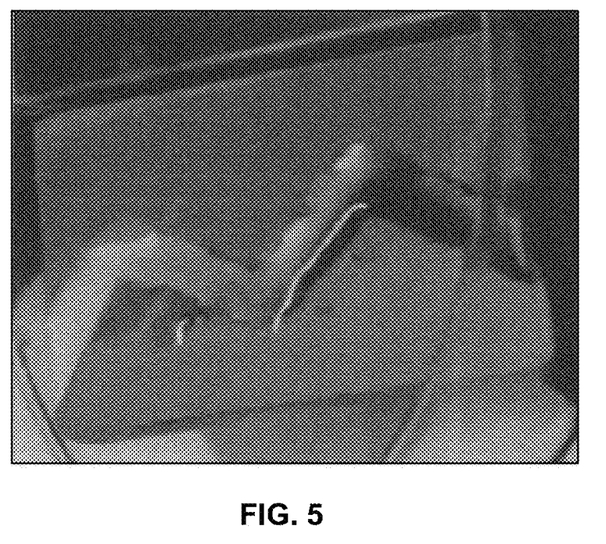
FIG. 5 is a photograph of a coolant channel formed by a repellant coating, according to one example.

With reference to FIGS. 4 and 5, an illustrative example and an experimental sample are shown of a hydrophobic/oleophobic coating forming a flow path 402 for a liquid, such as a coolant (e.g., water or ATF). The flow path 402 may be formed by one or more lines, strips, layers, or areas 404 of the repellant coating. Here a channel is formed between a first repellant coating 404A and a second repellant coating 404B. In the example shown in FIG. 4, two spaced apart lines 404A, 404B form the flow path 402. The lines 404 may be evenly spaced to form a flow path 402 having a constant or substantially constant width. However, in other embodiments, the flow path 402 may have a non-constant width. The lines 404 may be configured to form a flow path 402 having any shape or pattern. In the embodiment shown in FIG. 4, the lines 404A, 404B form a zig-zag flow path, which may also be referred to as a sinuous, serpentine, winding, or oscillating flow path.

In at least one embodiment, the line(s) 404 of the repellant coating may form the flow path 402 without any raised walls or sunken/carved channels. That is, the flow path 402 may be formed due solely to the repellence of the liquid (e.g., coolant) from the coating. The use of the lines, strips, etc. of the repellant coating may therefore allow for control or influence of the flow of coolant without the need for relatively large physical barriers, such as channels walls or channels trenches or troughs. Instead, a thin coating may be used to control/influence the flow of coolant. As shown in FIG. 5, the coating may be very thin so as to be essentially even or flush with the surface applied thereto relative to the height of the coolant being controlled. For example, the coating may have a thickness of less than 1 mm, such as less than 500 µm, 250 µm, 100 µm, 50 µm, 25 µm, or 15 µm.

In at least one embodiment, in addition to the line(s) 404 of the repellant coating, a hydrophilic or oleophilic coating 406 may also be applied to form the flow path 402. In one embodiment, at least a portion of the area of the flow path 402 may be coated with the hydrophilic or oleophilic coating (herein after "wetting coating"). For example, the entire area of the flow path 402 may be coated with the wetting coating. In another embodiment, lines of the wetting coating may be applied within the flow path 402. For example, lines may be applied that are parallel to the lines 404 of the repellant coating. Accordingly, the wetting coating may help further control the flow of a coolant in the flow path. The lines 404 of the repellant coating may form an outer boundary of the flow path 402 while the wetting coating 406 encourages the coolant to flow across it in the desired direction.

Examples of application of the coatings shown and described with reference to FIGS. 4-5 that relate to flow paths in which there are two spaced apart lines or strips of coating to form one flow path include coatings to a stator core and a rotor. In one embodiment, lines as shown by elements 404A and 404B may be applied to a rotor. The lines may be parallel with the rotational axis of the rotor, or the lines may form a partial helical pattern, such as an Archimedes screw configuration, to aid in movement of a fluid across the surface of the rotor to aid in cooling and movement and removal of the fluid from through the electric machine. However, there may be fewer lines (e.g., one) or there may be more lines (e.g., three or more) to control the flow of a liquid, such as coolant. For example, a single line 404A may be applied to a surface in order to prevent or reduce the flow of liquid from passing that line and/or to keep the liquid on one side of the line. In other examples, three or more lines 404A and 404B may be applied to a surface to create multiple flow paths 402. In one embodiment, a single flow path 402 may be split into multiple flow paths, such as two (bifurcated), three (trifurcated), or more flow paths. Of course, multiple sets of lines 404A and 404B may also be used to form a plurality of discrete flow paths 402. Similarly, lines, layers, or strips of the wetting coating 406 may be applied to attract or encourage coolant to flow in a direction or path of the coating 406. The wetting coating 406 may be used in conjunction with the repellant coating for even greater control of the coolant flow.

In at least one embodiment, the repellant coating may be used to form one or more coolant flow paths 402 on an electric machine, such as electric machine 100. For example, the repellant coating may be used to form flow paths 402 on the windings 120, such as the end windings 126 of an electric machine. During operation of an electric machine, coolant, such as an oil-based coolant (e.g., ATF), may be introduced onto the end windings 126 to remove heat therefrom. The coolant may be introduced onto the end windings 126 in a variety of ways, depending on the design of the particular electric machine. In some designs, coolant may be pumped or otherwise released onto the end windings 126. The coolant may be introduced at the top of the end windings or on an upper portion of the end windings and allowed to fall by gravity to pass by and be drawn into the channels formed between the stator teeth in which movement occurs based on the rotation and surface tension of the coatings to cool the rotor and stator core.

Figure 6:
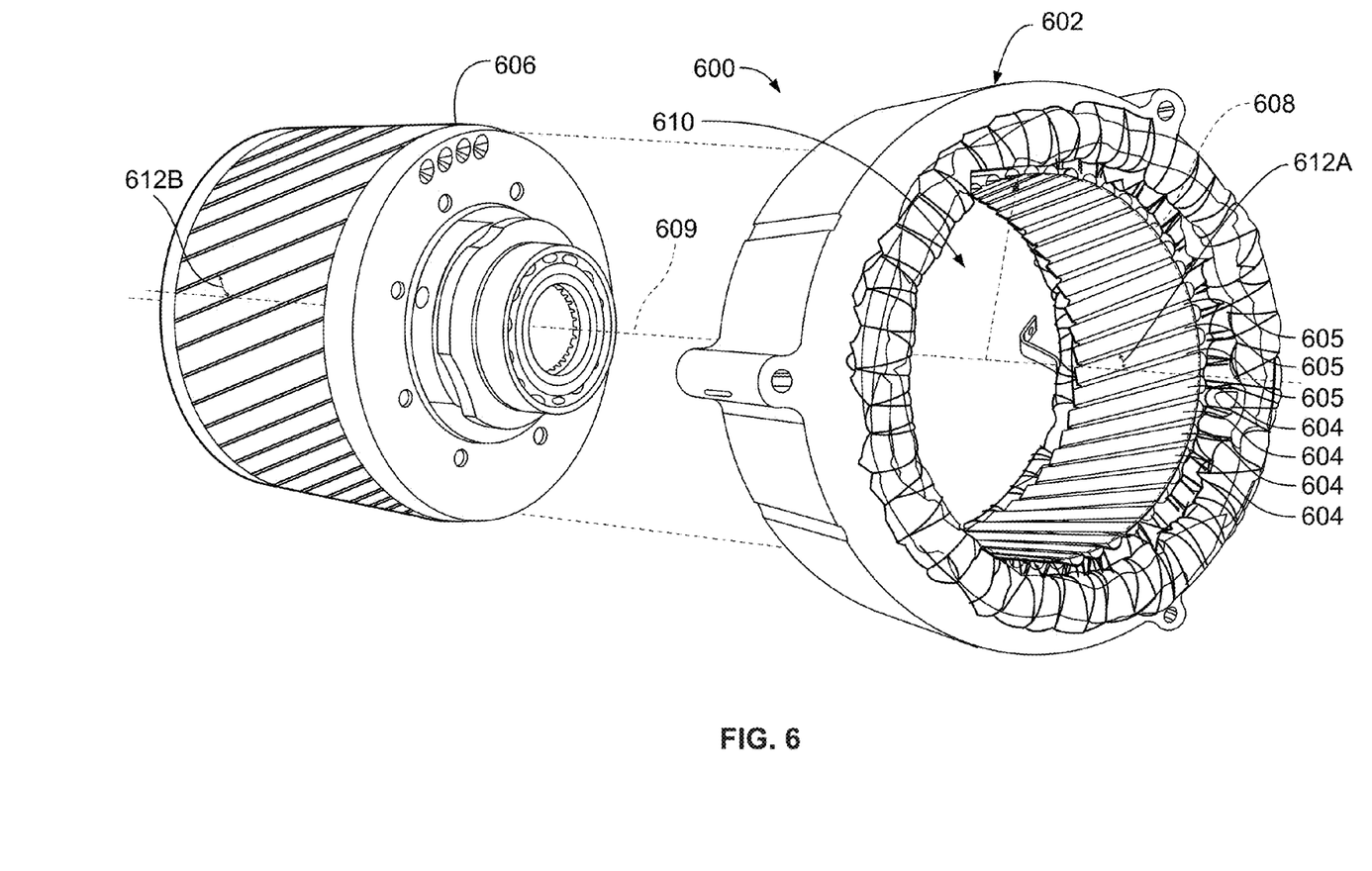
FIG. 6 is a perspective exploded view of an example of an electric machine having partial helical stator teeth and correspondingly oriented permanent magnets in a rotor.

FIG. 6 shows an example of an electric machine for an electrified vehicle, referred generally as an electric machine 600 herein. The electric machine includes a stator core 602, having stator teeth 604 and gaps 605 between the stator teeth 604, and a rotor 606. Stator windings are located in the gap 605 and the stator windings are wrapped around each stator tooth 604 such that a field is generated in the stator tooth to cooperate with the rotor 606. Similar to FIG. 1B, an electric machine contains poles, for example, a two pole electric machine has a single pair of magnetic poles (north and south) and is typically referenced as a 2-pole motor. In some embodiments, stator windings are the north and south poles, and, a number of stator windings can be a reasonable number of poles ranging from 2 to 12, such as 4, 6, or 8 poles. Typically, motors are not configured with more than 12 poles. Along with a number of poles, an electric machine may have a range of a number of stator teeth 604, for example, often the range of the number of stator teeth 604 of an electric machine may be from 6 to 48 stator teeth 604, such as 9, 12, 15, 18, 21, 24, 27, 30 and other multiples of 3, and may be more in some configurations. An electric machine with 48 stator teeth is typically configured with each tooth offset from the previous tooth by approximately 7.5 degrees.

Electrified vehicles may include two electric machines, often electric machine may be operated as both a generator and a motor. However, in some embodiments one of the electric machines may function more efficiently as a motor and the other may function more efficiently as a generator. The motor may operate to convert electricity to mechanical power and the generator may operate to convert mechanical power to electricity. The stator core 602 may define a circumference 608 based on an inner diameter of the stator and a cavity 610. The rotor 606 may be sized to fit and operate within the cavity 610. A shaft (not shown) may be operably connected to the rotor 606 to drive rotation thereof around a central axis 609. When the rotor 606 is disposed within the cavity 610, a gap is formed between a surface of the stator teeth 604 and an outer diameter of the rotor 606. The surface of the stator teeth forms a circumference 608 around a central axis 609 of the electric machine 600, the circumference defines the cavity 610 that is sized such that the rotor 606 fits within the cavity 610 thereby producing a gap between an outer surface of the rotor 606 and the inner diameter of the stator as defined by the stator teeth.

Windings may be disposed within the gaps 605 of the stator core 602. In an electric machine operating as a motor, for example, current may be fed to the windings to induce a magnetic field that creates a rotation force on the rotor 606. Alternatively, the electric machine may be configured as a generator such that a current is induced in the windings by a rotation of an electric field from the rotor 606. During operation of the electric machine 100, heat may be generated along the gaps 605 between the stator teeth 604 in which windings pass. The windings pass a current to either create a magnetic field that is directed by the stator teeth 604 to apply a force on the rotor 606. To remove heat generated in the windings that are located along the gaps 605 between the stator teeth 604, a coolant may flow from a radiator, around and through the stator 602 and back to the radiator.

Here, the application of a repellant onto the surface of the stator teeth 604 (i.e., the inner diameter of the cavity) and onto the surface of the outer diameter of the rotor 606 may be used to decrease the friction of the rotor 606 spinning within the cavity 610. By increasing the contact angle, the area that the fluid is in contact with the surfaces is reduced and thereby reducing the friction. In another embodiment, a repellant such as an oleophobic, super-oleophobic, hydrophobic, or super-hydrophobic is applied to a surface of the stator teeth 604 along circumference 608 defined by the inner diameter, while a wetting coating, such as an oleophilic, super-oleophilic, hydrophilic, or super-hydrophilic, is applied to the windings located in the gaps 605 between the stator teeth 604. This configuration creates a channel in the gaps 605 between the stator teeth 604 while repelling fluid from the space between the stator teeth 604 and the rotor 606 surface. Further, the orientation of the stator teeth 604 is at an angle 612A with respect to the central axis 609 of the stator core 602. The angle 612A of the stator teeth 604 results in an equal angle of channels formed between stator teeth 604 in the gaps 105 in which the winding pass. The angle 612A is such that the stator teeth 604 form a partial helical surface upon which the repellant is applied. This partial helical surface at the angle 612A also improves the flow of a fluid caught in the air gap between the rotor 606 and the inner diameter of the surface of the stator teeth 604. Likewise, the rotor 606 has a corresponding angle 612B that matches the angle 612A of the stator teeth. The angles 612A and 612B of rotor 606 and stator teeth 604 may be less than 20 degrees, such as less than or equal to 15, 10, 5, 2, or 1 degree. Further, in another embodiment, a helical spiral may be formed by lines of a coating on the rotor 606 to create an Archimedes screw configuration thereby promoting the movement of fluid in the channels formed in the gaps 605 between the stator teeth 604.

The repellant coating may also be used for preventing a liquid (e.g., a coolant, such as water or oil) from falling or passing through air gaps between two surfaces. The two surfaces may be surfaces of components of an electric machine, such as electric machine. For example, the surfaces may be the stator teeth and the rotor surface.

Accordingly, (super) hydrophobic and/or oleophobic coating materials and/or (super) hydrophilic or oleophilic coating materials may be utilized in electric machines thermal management. The use of these coating materials may allow for a uniform flow distribution without additional coolant loop(s) and pumping power, which may require additional costs and may result in efficiency losses. In addition, the coating materials may improve the reliability of electric machines by eliminating localized hot spots and decreasing power loss due to the reduction of end-winding temperatures. Moreover, a reduction in electric machine size may be realized due to the super hydrophobic/oleophobic coated surfaces.

It has been found that large turns in the coolant channels may result in regions or zones where the coolant stagnates and/or recirculates (e.g., forms eddies). These zones, referred to herein as recirculation zones, may result due to low or no-slip conditions at the channels walls. These conditions may be causes by the relatively high angle turns in the channels. The recirculation zones may occur in the corner(s) of a high angle turn. Accordingly, a portion of the coolant may become stuck in the recirculation zones during operation of the cold plate and may reduce the effectiveness and/or efficiency of the cold plate. Further, the use of a partial helical stator teeth surface may help improve and direct the flow along channels within the stator core 602 and the channels in the gaps 605 between stator teeth 604.

Similar to above with respect to FIGS. 4-5, a wetting coating may also be applied within the channels to further encourage coolant to flow therethrough. For example, the wetting coating may be applied to a portion or all of a channel, such as in the form of lines or as a continuous layer. In one embodiment, the wetting coating may be applied in an arcuate direction in the area indicated by the flow arrows. The wetting coating(s) may therefore further facilitate the flow of coolant through the channels so that it does not get stuck in recirculation zones.

In at least one embodiment, it has been discovered that a repellant coating (e.g., hydrophobic or oleophobic, described above) may be use as a gap filler and/or barrier to prevent cross-flow of coolant. Layers of the repellant coating may be applied to the top surfaces of the stator teeth 104 or 604. Accordingly, even if gaps exist between the top surfaces of the stator teeth and the rotor 106 or 606, the coolant may be repelled from passing through the air gap by being directed into channels formed between the stator teeth 104 or 604 and the gaps 105 or 605 therebetween. In addition to, or instead of, applying the coating to the top surfaces of the stator teeth 104 or 604, the coating may be applied to a side of the stator teeth 104 or 604 to further promote flow of a fluid in channels formed between the stator teeth 104 or 604 and the gaps 105 or 605 therebetween.

Accordingly, (super) hydrophobic and/or oleophobic coating materials and/or (super) hydrophilic and/or oleophilic coating materials may be utilized for the inverter thermal management. The use of these coating materials may allow for a uniform flow distribution without adding physical channel walls or steps and pumping power. These additions may add costs, increase pressure drop, and add efficiency losses. In addition, the coatings may improve the reliability of the inverter system by eliminating localized hot spots and/or decreasing power losses due to the reduction of component temperature increases caused by the localized hot spots.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric machine comprising:
   a stator defining a circular opening having an inner diameter, the stator further defining a plurality of teeth having a plurality of surfaces along the inner diameter;
   a rotor configured to rotate within the circular opening such that a gap is formed between the rotor and stator;
   an oleophobic or hydrophobic coating on the rotor and stator configured to increase a contact angle between lubricating fluid and the rotor and stator in contact therewith to control a flow of the fluid in the gap; and
   an oleophilic or hydrophilic coating applied to windings around the teeth such that a channel is formed between the oleophobic or hydrophobic coated teeth along the oleophilic or hydrophilic coating to control the fluid flow over the windings, wherein the windings are configured to generate a magnetic field in the teeth.

2. The electric machine of claim 1, wherein the stator further defines teeth forming a partial helical surface along the inner diameter, and wherein the oleophobic or hydrophobic coating controls a flow of the fluid along the partial helical surface.

3. The electric machine of claim 1, wherein the oleophobic or hydrophobic coating is a super-oleophobic or super-hydrophobic coating that creates a contact angle between a droplet of the fluid and a surface along the inner diameter of the stator greater than 140°.

4. The electric machine of claim 1, wherein the oleophobic or hydrophobic coating is a fluorinated polymer.

5. The electric machine of claim 1, wherein the oleophobic or hydrophobic coating is Polytetrafluoroethylene.

6. The electric machine of claim 1, wherein the fluid is an automatic transmission fluid.

7. A vehicle powertrain comprising:
   a stator defining a circular opening having an inner diameter, the stator further defining a plurality of teeth having a plurality of surfaces along the inner diameter;
   a rotor configured to rotate within the circular opening such that a gap is formed between a rotor surface and the stator at the inner diameter;
   an oleophobic or hydrophobic coating, coated on the stator and the rotor surface, configured to control fluid flow in the gap; and
   an oleophilic or hydrophilic coating applied to windings around the teeth such that a channel is formed between the oleophobic or hydrophobic coated teeth along the oleophilic or hydrophilic coating to control the fluid flow over the windings, wherein the windings are configured to generate a magnetic field in the teeth.

8. The vehicle powertrain of claim 7, wherein the fluid is an automatic transmission fluid.

9. The vehicle powertrain of claim 7, wherein the stator further defines teeth forming a partial helical surface along the inner diameter, and wherein the repellant controls a flow of the fluid along the partial helical surface.

10. The vehicle powertrain of claim 9, wherein the repellant is a super-oleophobic or super-hydrophobic coating that creates a contact angle between a droplet of the fluid and a surface along the inner diameter of the stator greater than 140°.

11. The vehicle powertrain of claim 7, wherein the oleophobic or hydrophobic coating is a fluorinated polymer.

12. The vehicle powertrain of claim 7, wherein the oleophobic or hydrophobic coating is Polytetrafluoroethylene.

13. The vehicle powertrain of claim 7, wherein the fluid is an automatic transmission fluid.

14. An electric machine comprising:
a stator defining a circular opening having an inner diameter, the stator further defining a plurality of teeth having a plurality of surfaces along the inner diameter;
a rotor configured to rotate within the circular opening such that a gap is formed between the rotor and stator;
an oleophobic coating on the rotor and stator configured to increase a contact angle between lubricating fluid and the rotor and stator in contact therewith to control a flow of the fluid in the gap; and
an oleophilic coating applied to windings around the teeth such that a channel is formed between the oleophobic coated teeth along the oleophilic coating to control the fluid flow over the windings, wherein the windings are configured to generate a magnetic field in the teeth.

15. The electric machine of claim 14, wherein the stator further defines teeth forming a partial helical surface along the inner diameter, and wherein the oleophobic coating controls a flow of the fluid along the partial helical surface.

16. The electric machine of claim 14, wherein the oleophobic or coating is a super-oleophobic coating that creates a contact angle between a droplet of the fluid and a surface along the inner diameter of the stator greater than 140°.

* * * * *